Figure 1:
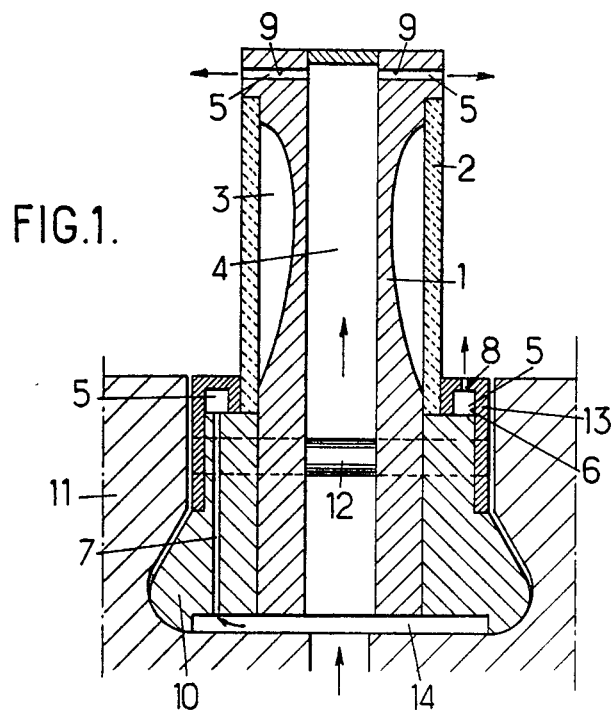

United States Patent [19]

Boudigues et al.

[11] Patent Number: 4,563,125
[45] Date of Patent: Jan. 7, 1986

[54] CERAMIC BLADES FOR TURBOMACHINES

[75] Inventors: Serge Boudigues, Sceaux; Georges Frattacci, Issy les Moulineaux; Alain Ponthieux, Meudon, all of France

[73] Assignee: Office National D'Etudes et de Recherches Aerospatiales, France

[21] Appl. No.: 561,082

[22] Filed: Dec. 14, 1983

[30] Foreign Application Priority Data

Dec. 15, 1982 [FR] France .............................. 82 21041

[51] Int. Cl.$^4$ ............................ F01D 5/18; F01D 5/28
[52] U.S. Cl. .................................. 415/115; 416/96 R; 416/97 R; 416/241 B
[58] Field of Search ............... 416/241 B, 96 R, 97 R, 416/90 R, 91, 226, 96 A, 241 R; 415/115

[56] References Cited

U.S. PATENT DOCUMENTS

| | | | |
|---|---|---|---|
| 3,433,015 | 3/1969 | Sneeden | 416/90 |
| 4,017,209 | 4/1977 | Bodman | 416/241 B X |
| 4,247,259 | 1/1981 | Saboe et al. | 416/226 X |
| 4,285,634 | 8/1981 | Rossman et al. | 416/241 B X |
| 4,288,201 | 9/1981 | Wilson | 415/115 |
| 4,293,275 | 10/1981 | Kobayashi et al. | 416/96 R X |
| 4,396,349 | 8/1983 | Hueber | 416/96 A X |
| 4,480,956 | 11/1984 | Krüger | 416/96 A X |

FOREIGN PATENT DOCUMENTS

| | | | |
|---|---|---|---|
| 999820 | 2/1952 | France | 416/241 B |
| 57426 | 1/1953 | France | 416/241 B |
| 2463849 | 4/1981 | France | 416/241 B |

Primary Examiner—Everette A. Powell, Jr.
Attorney, Agent, or Firm—Larson and Taylor

[57] ABSTRACT

The blade comprises a metal web (1) surrounded by a refractory ceramic casing (2). The central web (1) is provided with at least one ventilation passage (4) in which flows a small amount of ventilation air. The zones where there is contact between the ceramic casing (2) and the central metal web (1) are provided with cooling cavities (5) in which cooling air flows at a high rate so as to establish a forced cooling condition.

6 Claims, 2 Drawing Figures

CERAMIC BLADES FOR TURBOMACHINES

The invention relates to rotary or fixed blades for turbomachines, more especially gas turbines or turbojets.

It has already been proposed to construct such blades with a central web, generally made from metal, surrounded by a refractory ceramic casing. The central metal web provides the mechanical strength of the blade and the refractory ceramic casing confers on the blade a good resistance to high temperatures.

In blades thus constructed, there arises a cooling problem which is particularly acute when there is mechanical contact between the ceramic casing and the central web.

So it has already been proposed to construct the blade so that the facing surfaces of the central web and the ceramic casing are, in the middle region of the blade, spaced apart from one another so as to define one or more closed spaces in which there occurs heat transmission by radiation from the ceramic casing towards the central web and, in both endmost regions of the blade, in contact with each other so as to define one or more zones for maintaining the ceramic casing in position on the central web.

The aim of the invention is precisely to provide arrangements ensuring efficient cooling of the blade thus constructed, as well as good resistance thereof to thermal shocks and to temperature gradients.

To this end, and in accordance with the invention, the central web is provided with at least one ventilation passage in which there flows a small amount of ventilation fluid and, at least some of the maintaining zones are provided with at least one cavity in which a cooling fluid flows with a substantially higher rate establishing a forced cooling condition.

With this arrangement, on the one hand, ventilation of the central web through its ventilation passage is sufficient to remove the heat emitted by radiation from the internal surface of the ceramic casing, while avoiding high temperature differences between the external surface and the internal surface of the ceramic casing and, on the other hand, the forced cooling in the cooling cavity allows the discharge of the high heat concentration which is met with in the maintenance zones where there is contact between the internal surface of the ceramic casing and the surface of the central web.

According to a first arrangement of the invention, the cooling cavity is formed by an annular grove extending parallel to the profile of the blade and supplied, in so far as the cooling fluid feed is concerned, by at least one duct connected to the input of the ventilation passage of the central web, or connected directly to the fluid source, and in so far as discharge of the cooling fluid is concerned, by at least one duct opening into the gas stream flowing through the turbomachine.

According to another arrangement of the invention, the cooling cavities are formed by a plurality of radial passages communicating the ventilation passage of the central web with the gas stream flowing through the turbomachine.

The invention consists, apart from the arrangements which have just been discussed, of certain other arrangements which are used preferably at the same time and which will be more explicitly discussed hereafter.

The invention will, in any case, be well understood with the complement of description which follows as well as the accompanying drawings, which complement and drawings relate to a preferred embodiment of the invention and of course comprise no limiting character.

FIG. 1, of these drawings, shows a schematical section of a rotary blade constructed in accordance with the invention.

Figure 2:
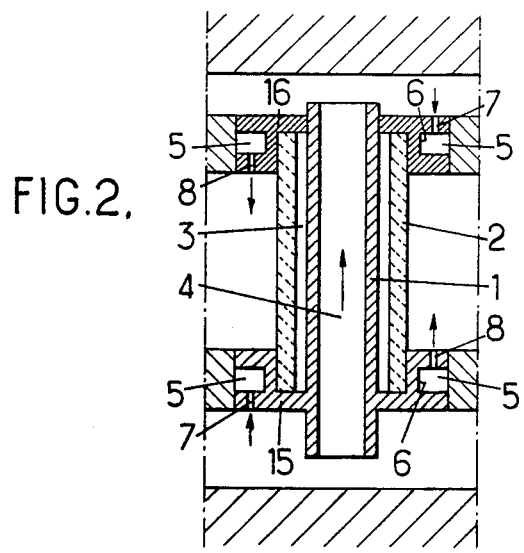

FIG. 2 shows a schematical section of a fixed blade constructed in accordance with the invention.

In FIGS. 1 and 2, the blade shown comprises a central metal web 1 surrounded by a ceramic casing 2.

The facing surfaces of this central web 1 and of the ceramic casing are:

in the middle region of the blade, spaced apart from each other so as to define one or more closed spaces 3 in which heat transmission takes place by radiation from the ceramic casing 2 towards the central web 1.

For cooling this blade, on the one hand, the central web 1 is provided with at least one ventilation passage 4 in which there flows a small amount of ventilation air, and on the other hand, at least some of the maintenance zones are provided with at least one cooling cavity 5 in which cooling air flows at a substantially higher rate so as to establish a forced cooling condition.

As shown in FIGS. 1 and 2, this cooling cavity 5 may be formed by an annular groove 6 extending parallel to the profile of the blade and supplied, in so far as the cooling air feed is concerned by one or more ducts 7 connected to the input of the ventilation passage 4 of the central web 1, and in so far as removal of the cooling air is concerned, by one or more ducts 8 opening into the gas stream flowing through the turbomachine. Advantageously, the ducts 8 are staggered angularly with respect to ducts 7.

In FIG. 1 is shown a rotary blade which comprises a splayed foot 10 for holding it in the disc 11 of the turbomachine. This foot 10 is firmly secured to the central web 1 by means of fixing pin 12. The annular groove 6 is then defined by the external surface of this foot 10 and by a profiled part 13 surrounding the blade and which may be held on foot 10 by means of the fixing pin 12.

The ducts 7 for supplying the annular grove 6 are then formed in the foot 10 of the blade and communicate with the inlet of the ventilation passage 4 of the central web 1 through a chamber 14 formed in foot 10 of the blade and having a laminar shape.

Thus, the annular grove 6 is supplied from upstream of the ventilation passage 4.

In FIG. 2, there is shown a fixed blade which comprises, at one of its two ends a base 15 integral with the central web 1 and, at its other end, an added flange 16 also firmly secured to the central web 1.

This blade comprises two annular grooves 6 respectively at each of the two endmost regions of the blade, which are provided by a special arrangement of base 15 and the added flange 16.

Thus, the two annular grooves 6 are supplied respectively from upstream and from downstream of the ventilation passage 4.

As shown in FIG. 1, the cooling cavity 5 may be formed by a plurality of radial passages 9 communicating the ventilation passage 4 of the central web 1 with the gas stream flowing through the turbomachine.

These radial passages are, in the case of FIG. 1 which shows a rotary blade, provided in the vicinity of the head of the blade and they are fed from downstream of the ventilation passage 4.

The fact that the cooling cavity 5 is fed with cooling air from downstream of the ventilation passage 4 of the central web 1 is made possible because of the low amount of heating which this air undergoes when passing through said ventilation passage 4, which low amount of heating is due to the transmission of heat alone by radiation from the ceramic casing 2 towards the central web 1.

By way of example, the following operating conditions may be mentioned for a rotary blade in accordance with the invention and mounted in a turbojet:

flow temperature of the gas stream flowing through the turbine of the turbojet: 1890° C.;

angle of incidence of the blade: 45°;

temperature of the ceramic casing 2 (formed by silicon carbide) in the region of the leading edge of the blade: 1305° C. on the upstream side, 1070° C. on the downstream side;

total air flow passing through the ventilation passage 4 of the metal web 1 for all the blades of the turbine: 3% of the total flow from the compressor of the turbojet;

temperature of the cooling air upstream of the ventilation passage 4: 700° C.;

temperature of the cooling air downstream of the ventilation passage 4: 1100° C.;

fraction of the cooling air flow taken from upstream of the ventilation passage 4 for cooling the cooling cavity 5 formed by the annular grove 6: 6% of the total flow coming from the compressor.

We claim:

1. A turbine blade, suitable for use in a gas turbine, comprising:

a metal core;

a ceramic shell surrounding said metal core;

at least one longitudinal cooling channel provided in said metal core;

a space between the metal core and the ceramic shell in the middle part of the blade;

two contact areas between the metal core and the ceramic shell respectively at the two end parts of the blade;

means for cooling at least one of said two contact areas, said cooling means comprising a metallic annular cooling chamber outwardly surrounding the ceramic shell in front of said at least one contact area, said annular cooling chamber defining a circumferential cooling path which extends around said ceramic shell.

2. A turbine blade according to claim 1, in which the cooling chamber has a coolant outlet and a coolant inlet, said outlet and inlet being located at different points along the circumference of said annular cooling chamber.

3. A turbine blade according to claim 1 further comprising conduit means for conveying coolant fluid from a point upstream of said longitudinal cooling channel into said cooling chamber.

4. A turbine blade according to claim 2 further comprising conduit means for conveying coolant fluid from a point upstream of said longitudinal cooling channel to said cooling chamber coolant inlet.

5. A turbine blade according to claim 1 further comprising conduit means for conveying coolant fluid from a point downstream of said longitudinal cooling channel into said cooling chamber.

6. A turbine blade according to claim 2 further comprising conduit means for conveying coolant fluid from a point downstream of said longitudinal cooling channel to said cooling chamber coolant inlet.

* * * * *